(12) United States Patent  
Wilsher et al.

(10) Patent No.: US 9,134,009 B2  
(45) Date of Patent: Sep. 15, 2015

(54) METHOD AND APPARATUS FOR CORRECTING LIGHT GUIDE PATTERNING WITH A SECONDARY DIFFUSER

(75) Inventors: Michael John Wilsher, Letchworth (GB); Brian Noel Reid, Welwyn Garden (GB); Paul Simon Golding, Mangrove Road (GB)

(73) Assignee: Xerox Corporation, Norwalk, CT (US)

( * ) Notice: Subject to any disclaimer, the term of this patent is extended or adjusted under 35 U.S.C. 154(b) by 100 days.

(21) Appl. No.: 13/597,468

(22) Filed: Aug. 29, 2012

(65) Prior Publication Data

US 2014/0063568 A1 Mar. 6, 2014

(51) Int. Cl.
  *H04N 1/04* (2006.01)
  *F21V 13/02* (2006.01)
  *F21V 13/12* (2006.01)
  *H04N 1/028* (2006.01)
  *F21V 7/04* (2006.01)

(52) U.S. Cl.
  CPC .............. *F21V 13/02* (2013.01); *F21V 13/12* (2013.01); *H04N 1/02835* (2013.01); *H04N 1/04* (2013.01)

(58) Field of Classification Search
  CPC ............ F21V 13/02; F21V 13/12; H04N 1/04
  See application file for complete search history.

(56) References Cited

U.S. PATENT DOCUMENTS

| | | | |
|---|---|---|---|
| 7,184,007 B2 * | 2/2007 | Tsai et al. | 345/87 |
| 2005/0206772 A1 * | 9/2005 | Yang | 348/335 |
| 2012/0113679 A1 * | 5/2012 | Boonekamp | 362/607 |

* cited by examiner

*Primary Examiner* — Fred Guillermety  
*Assistant Examiner* — Henok A Shiferaw  
(74) *Attorney, Agent, or Firm* — Fay Sharpe LLP

(57) ABSTRACT

An illuminator includes a light guide having a light source that is configured to emit light along a length of the light guide. The light guide further includes outcoupling zones affixed to a rear portion of the light guide, each zones affixed a predetermined distance from each other zone, which are configured to direct at least a portion of the emitted light. The light guide also includes a first diffuser that corresponds to a front portion of the light guide, and which operates to diffuse emitted light exiting the front portion of light guide. The illuminator further includes a secondary diffuser that is located a predetermined distance from the front portion of the light guide forming an air gap there between. The secondary diffuser is configured to further diffuse the at least a portion of the emitted light diffused by the first diffuser after passage through the air gap.

17 Claims, 8 Drawing Sheets

US 9,134,009 B2

METHOD AND APPARATUS FOR CORRECTING LIGHT GUIDE PATTERNING WITH A SECONDARY DIFFUSER

BACKGROUND

The exemplary embodiment relates to correcting diffusing artifacts from light guide patterning for a multifunction device. While the systems and methods described herein relate to artifact correction, it will be appreciated that the described techniques may find application in other image processing applications.

Xerographic reproduction devices utilize a light source to illuminate a document during copying, scanning, and facsimile operations. The illuminated document may then be reproduced as a digital image, a hardcopy output, or transmitted to a remote location to be output. A light source is used for the illumination of the document, however to fully illuminate the document, the light source may be coupled to a light guide, which directs the light evenly onto the document. Incandescent, halogen, or even fluorescent lamps may be used as the light source, with the light guide directing the output light along the document.

Light emitting diodes (LEDs) may be used as illumination sources. To fully illuminate a document, the LED light is injected into the end of a light guide and a pattern on the light guide is used to change the total internal reflection angle and eject the light at intervals from the light guide. However this pattern remains visible in the structure of the output light. When used in a scanning application it may be possible to calibrate out this non uniformity but if the illumination is not perfectly aligned to the sensor during the scan, as in the case for a full rate/half rate carriage system the pattern becomes visible.

Stated another way, it is highly difficult to utilize LED-based illuminators so as to provide an even illumination along the narrow strip of the document. A light guide uses a pattern to change the total internal reflection angles to eject light at intervals. This pattern in the light guide is not fixed relative to the charge-coupled device (CCD) array and therefore cannot be calibrated out. This pattern may result in an artifact on the output document, i.e., a visible image of the pattern may be depicted on the output document.

Accordingly, there is an unmet need for systems and methods that facilitate removal of light guide pattern artifacts on outputs of multifunction devices.

BRIEF DESCRIPTION

In some illustrative embodiments disclosed as illustrative examples herein, a scanning apparatus includes an illuminator for illuminating a portion of a document to be scanned. The illuminator has a light guide, which includes a light source operatively coupled to a first end, the light source configured to emit light along a length of the light guide, and a first diffuser corresponding to a front portion of the light guide, the first diffuser operable to diffuse at least a portion of the emitted light exiting the front portion of light guide. The illuminator of the scanning apparatus also includes a secondary diffuser located a predetermined distance from the front portion of the light guide forming an air gap there between, the secondary diffuser configured to further diffuse the at least a portion of the light diffused by the first diffuser after passage through the air gap.

In some illustrative embodiments disclosed as illustrative examples herein, an illuminator includes a light guide including a discrete light source operatively coupled to at least one end thereof. The illuminator further includes a first diffuser associated with a front portion of the light guide, the first diffuser operable to diffuse light emitted by the discrete light source. Additionally, the illuminator includes a secondary diffuser operable to diffuse the light diffuse by the first diffuser, wherein the first diffuser and the secondary diffuser are separated by a defined air gap.

In some illustrative embodiments disclosed as illustrative examples herein, a method for scanning a document includes emitting light into a light guide from a discrete light source. The light guide includes a plurality of outcoupling zones affixed to a rear portion of the light guide configured to direct at least a portion of the emitted light, and a first diffuser corresponding to a front portion of the light guide, the first diffuser operable to diffuse the at least a portion of the emitted light exiting the front portion of light guide. The method further includes transmitting the emitted light through the first diffuser to a secondary diffuser across an air gap. Additionally, the method includes illuminating the document with the emitted light transmitted through the first and secondary diffusers.

In some illustrative embodiments disclosed as illustrative examples herein, an illuminator for removing light guide patterning during document illumination includes a light guide, which has a light source operatively coupled to a first end, the light source configured to emit light along a length of the light guide. The light guide also includes a plurality of outcoupling zones affixed to a rear portion of the light guide, each of the plurality of outcoupling zones affixed a predetermined distance from each other outcoupling zone, the plurality of outcoupling zones configured to direct at least a portion of the emitted light. In addition, the light guide includes a first diffuser corresponding to a front portion of the light guide, the first diffuser operable to diffuse the at least a portion of the emitted light exiting the front portion of light guide. The illuminator further includes a secondary diffuser located a predetermined distance from the front portion of the light guide forming an air gap there between, the secondary diffuser configured to further diffuse the at least a portion of the emitted light diffused by the first diffuser after passage through the air gap.

DETAILED DESCRIPTION

Figure 1:
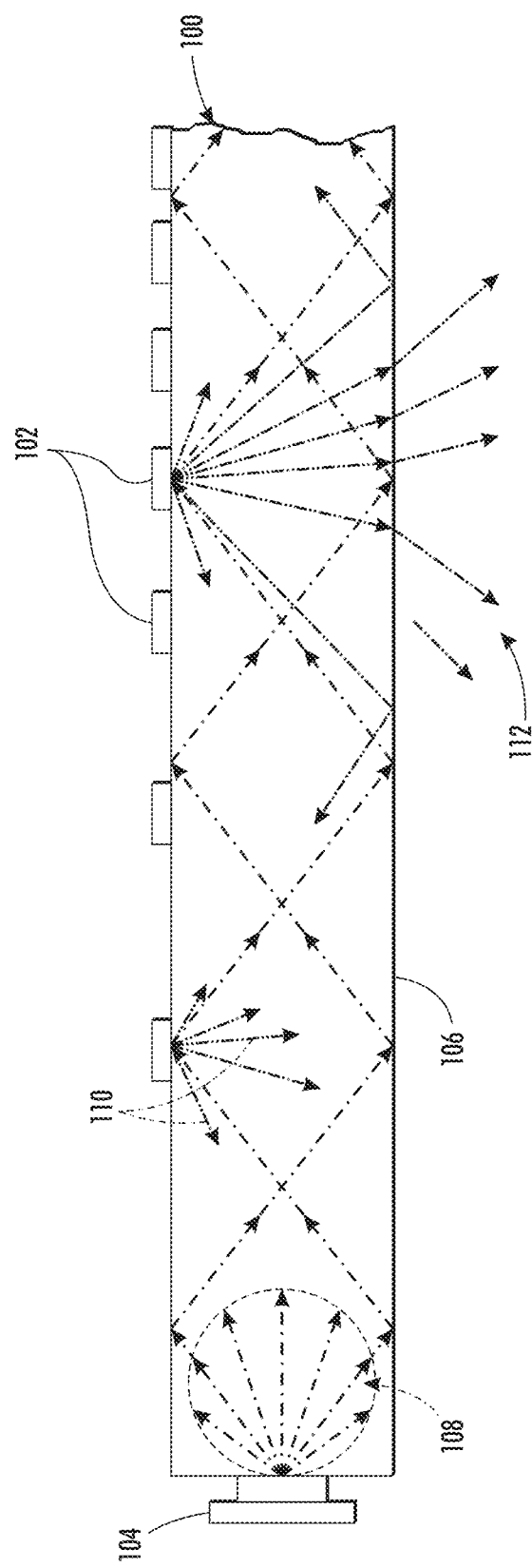
FIG. 1 is a high-level overview of operation of a light guide according to one embodiment.

One or more implementations of the subject application will now be described with reference to the attached drawings, wherein like reference numerals are used to refer to like elements throughout. Aspects of exemplary embodiments related to systems and methods are described hereinafter that facilitate resolving incidents using natural language descriptions.

Aspects of the exemplary embodiment relate to an illuminator and to a document scanning apparatus or "scanner" which incorporates the illuminator. The exemplary embodiment also relates to a method of scanning physical documents for generating scanned images. The documents to be scanned may comprise sheets of paper or other flexible substrate, on which an image or images to be scanned is disposed. The scanner may form a part of an imaging device, such as such as a stand-alone scanner, a copier, a facsimile machine, or a multifunction device, in which a scanned image is rendered on paper and/or stored in digital form, for example, for display, processing, or transmission in digital form.

Without intending to limit the scope of the exemplary embodiment, the illuminator may include a light guide and a secondary diffuser which illuminates a document during a scanning operation and a document reproduction device which incorporates the light guide. A light guide may include one or more outcoupling zones on a rear side of a longitudinal tube comprising the light guide. The outcoupling zones form a pattern that is used to change the total internal reflection angles to eject light from the light guide at intervals, which pattern is not fixed relative to the charge-coupled device array. The pattern formed by these outcoupling zones may propagate on scanned documents, as the illumination provided by the light guide is subject to non-uniform diffusion through the front portion of the light guide. The patterns, or artifacts, are then recreated during reproduction of a document.

Figure 2:
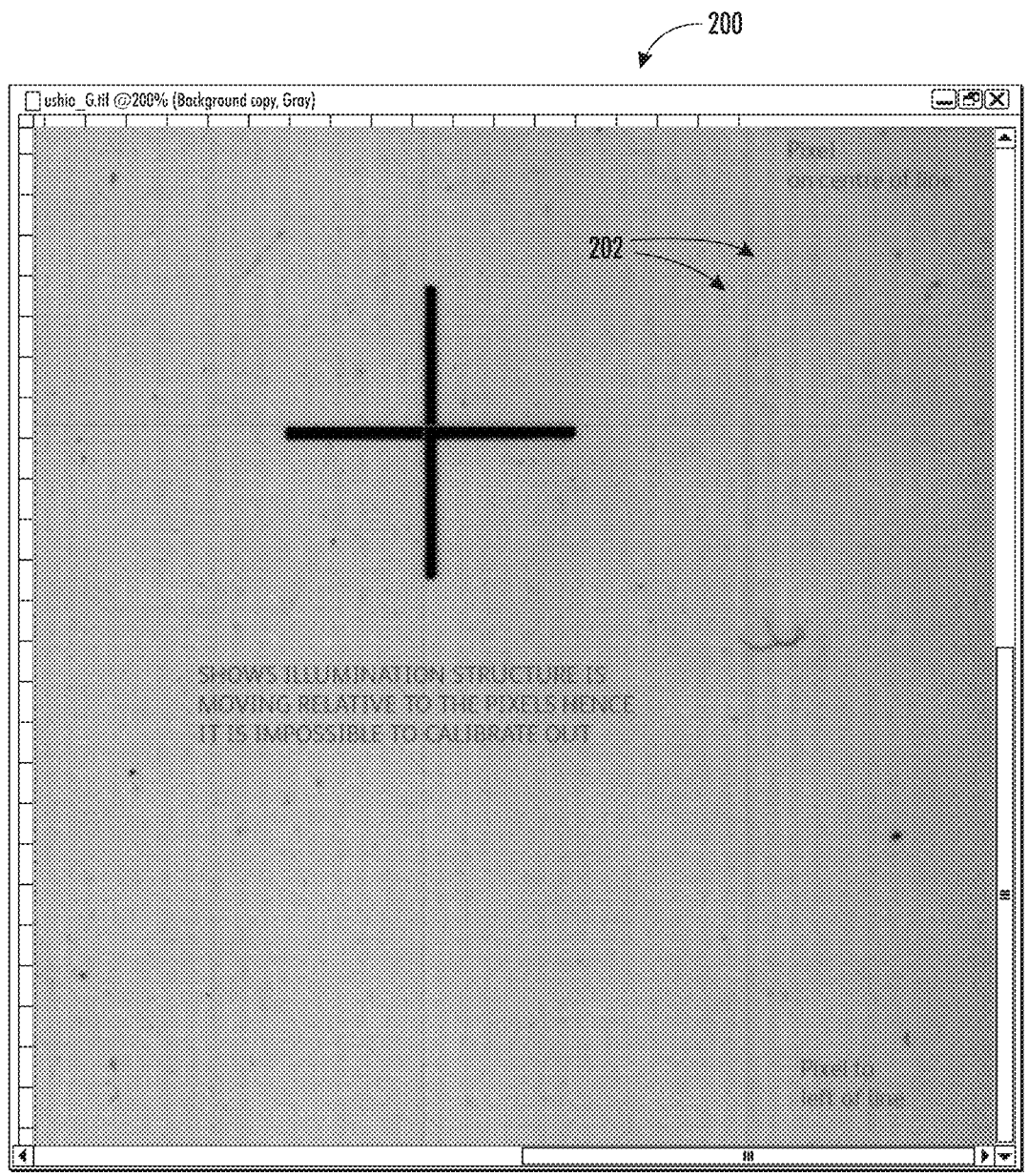
FIG. 2 is an illustration of an output utilizing the light guide of FIG. 1 according to one embodiment.

FIG. 1 illustrates an illuminator including a light guide 100 having an external, rear pattern (outcoupling zones) 102, a light source 104, and a front output 106. As illustrated in FIG. 1, light 108 produced by the light source 104, e.g., the light emitting diode, is scattered 110 within the light guide 100. Interacting with the outcoupling zones 102 allows some, but not all, of the scattered light 110 to escape through the front output 106 as illuminating light 112. The light 112 escaping via the front output 106 may then be used to illuminate a document for copying, scanning, and the like by an associated document reproduction device. FIG. 2 illustrates an output 200 utilizing the illuminator containing the light guide 100 of FIG. 1. As shown in FIG. 2, the patterning 202 from the outcoupling zones 102 on the output 200 is visible. FIG. 2 represents an attempt at calibrating out the patterning 202. However, as is shown, the illumination structure (patterning 202) is moving relative to the pixels of the underlying image, hence calibration fails in this respect.

Figure 3:
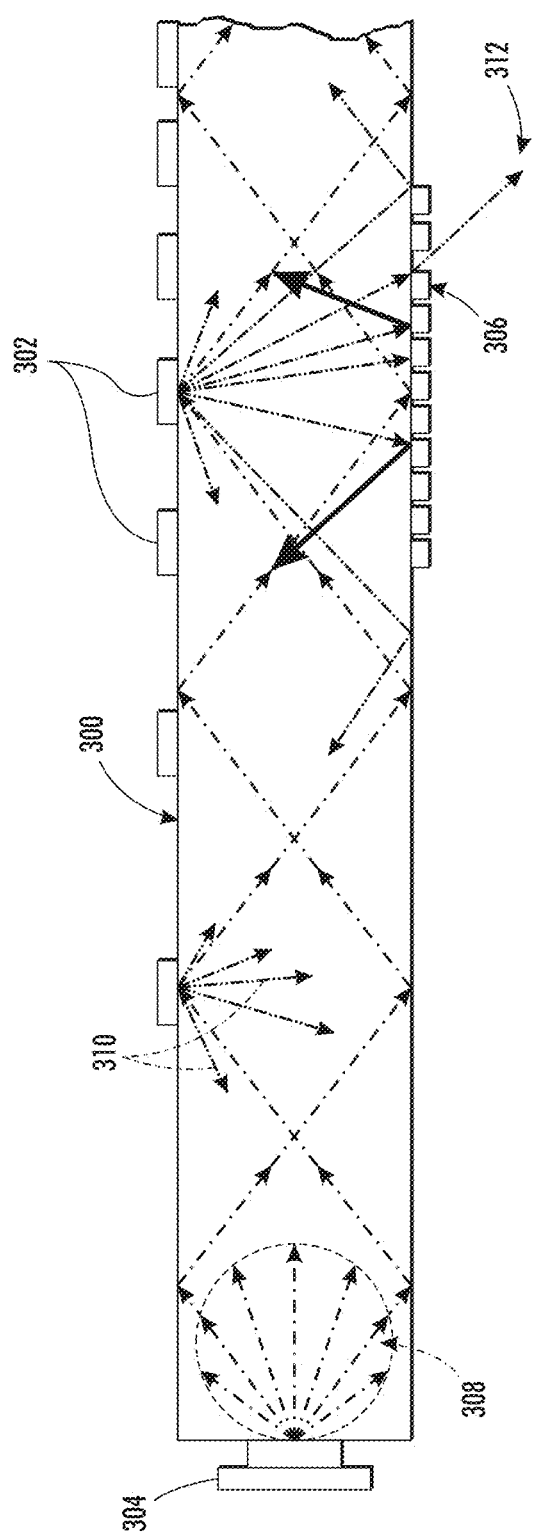
FIG. 3 is a high-level overview of operation of light guide employing front surface frosting according to one embodiment.

It will be appreciated that diffusing the light 112 produced by the light guide 100 may be sufficient to remove the defects, i.e., patterning 202, inherent in the light guide 100 of FIG. 1. One such method of diffusing the light 112 is a frost pattern on the front output 106 of the light guide 100. Accordingly, FIG. 3 illustrates an illuminator utilizing a light guide 300 having an external rear pattern (outcoupling zones) 302, a light source 304, and a frosted front output 306. The light 308 produced by the light source 304 may be scattered 310 due to interaction with the outcoupling zones 302.

As shown in FIG. 3, a portion of the scattered light 310 produced by interaction of the light 308 with the outcoupling zones 302 is reflected back into the light guide 300 in response to the frosted front output 306. A small portion of illuminating light 312 is therefore defused outward through the front output portion 306 as depicted in FIG. 3. However, such an attempt acts in much the same manner as the rear pattern, i.e., outcoupling zones 302, and has the added effect of changing the angle of refraction and turning a large portion of the potentially ejected light 312 back into the light guide 300, as clearly illustrated in FIG. 3. That is, the frosted front output 306 operates as additional outcoupling zones, negatively impacting the performance of the light guide 300 by changing the wave guide properties and allowing light 308 to leak out in areas that are not desirable.

Figure 4:
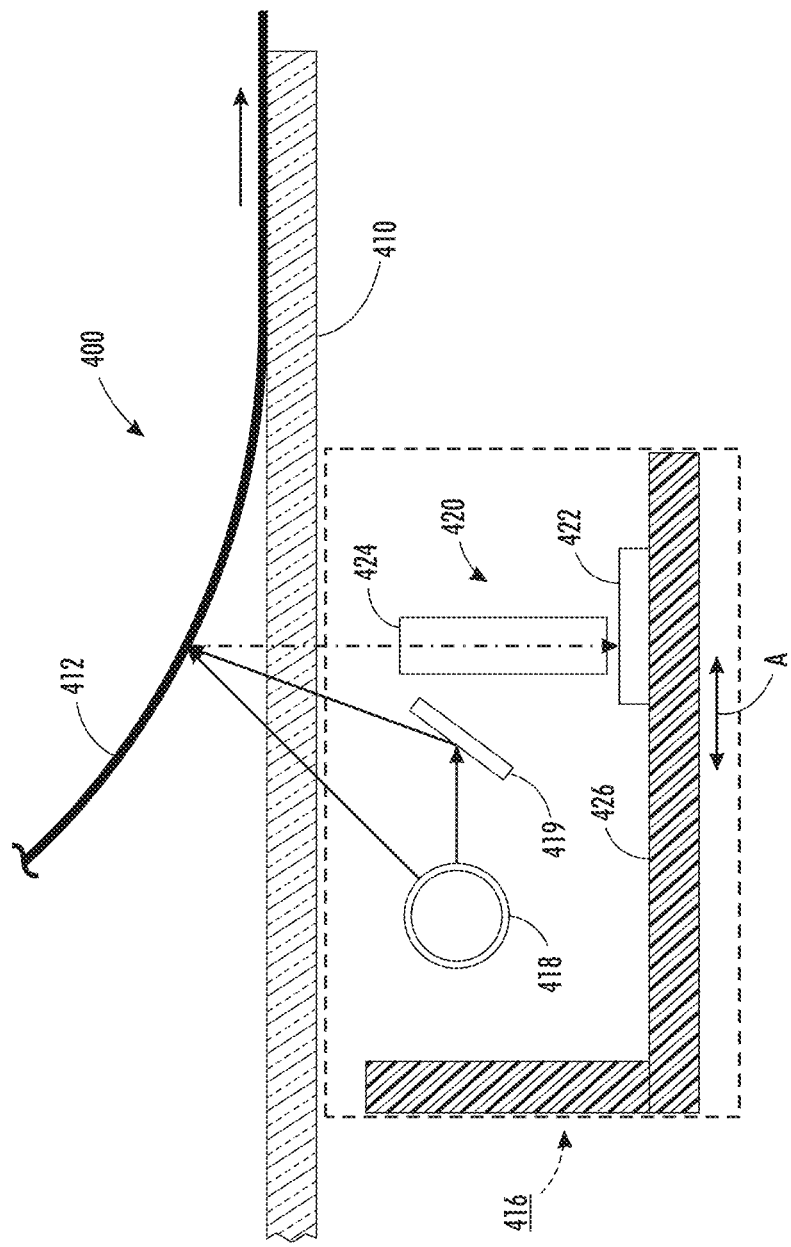
FIG. 4 is a simplified an elevational view of a document scanner according to one embodiment.

Referring now to FIG. 4, a document scanner 400 includes a platen 410, which may comprise distinct parts, on which a document sheet 412 can be placed for reproduction thereof. In some embodiments, a document handler (not shown) may be associated with the platen 410 that functions to sequentially feed sheets of a multi-page document to the platen 410 for recording.

The document scanner 400 of FIG. 4 may further include a scan head 416 that is positioned to illuminate the document and which includes an illuminator 418 and a detector 420 in accordance with the subject disclosure. As will be appreciated, the detector 420 may include, for example, a photosensitive device 422 and a lens arrangement 424. The illuminator 418, which is described in greater detail below with respect to FIGS. 5-7, in conjunction with a reflector 419, illuminates a thin strip of the document while the photosensitive device 422, which includes one or more linear arrays of photosensors, records the reflected light. The photosensors may comprise solid state devices, such as CCD (charge coupled device) or CMOS (complementary metal oxide semiconductor) devices. The detector 420 includes a suitable processing device (not shown) for generating an image comprising signals representative of reflected light recorded by the photosensitive device 422. The lens arrangement 424 is interposed between the platen 410 and the photosensitive device 422 for focusing the reflected light on the photosensor array. The scan head 416 can be mounted on a moveable carriage 426, for recording light reflected from images on sheets placed on the main portion of platen 410. In general, the carriage translates in direction A, as shown in FIG. 1.

It will be appreciated that the document scanner 400 depicted in FIG. 4 represents one example of a scanner device capable of implementing the illuminator 418 in accordance with the embodiments described herein. It will further be appreciated that other scanner devices with multiple illuminators, reflectors, photosensitive devices, in various configurations, may also utilize the illuminator 418 described herein.

Figure 5:
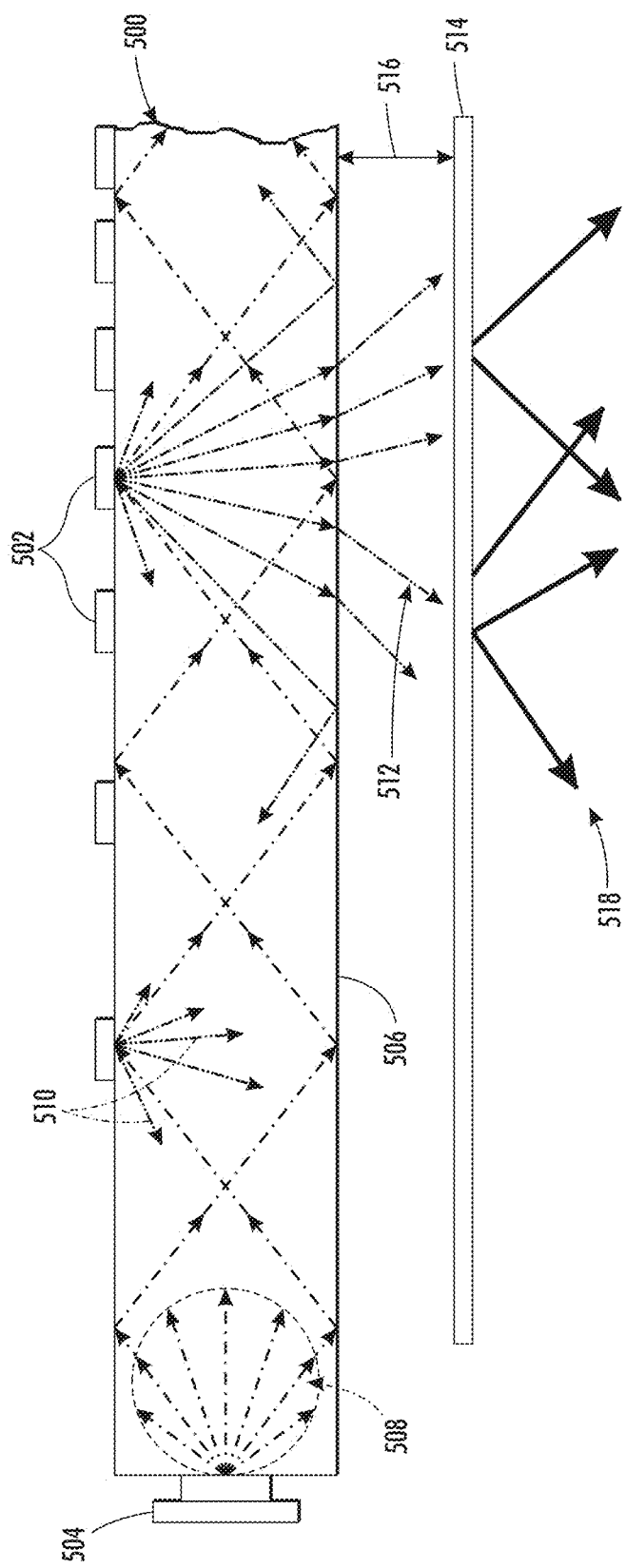
FIG. 5 is a high-level overview of operation of an illuminator having a secondary diffuser for correcting light guide patterning according to one embodiment.

Turning now to FIG. 5, there is shown a functional diagram of the illuminator 418 having a secondary diffuser 512 for correcting light guide patterning in accordance with one embodiment of the instant disclosure. As shown, the illuminator includes a light guide 500 generally tubular in shape, having a plurality of outcoupling zones 502 affixed to a rear portion thereof. The outcoupling zones 502 corresponding to a predetermined set of ridges or other reflective pieces configured to reflect light 508 produced by a light source 504, i.e., the scattered light 110, through a first diffusion component 506 of the light guide. Suitable examples of a light source 504 in accordance with embodiments contemplated herein include discrete light sources, such as light emitting diodes or laser diodes (both of which will be referred to herein as LEDs). In the exemplary embodiment described herein, the light source(s) 504 are actuated contemporaneously, for generation of a full width beam, although in other embodiments, it is contemplated that the LEDs may be actuated sequentially. Other discrete light sources are also contemplated, such as fiber optic light guide tubes. As shown in FIG. 4, the illuminator 418 and the reflector 419 are arranged at an angle relative to a surface of the document being recorded. These elements 418-419 may be configured to focus light from the illuminator 418 onto the imaging area of the platen 410.

In one embodiment, the document scanner 400 may include memory for storing the scanned digital image. An image rendering device incorporating or linked to the document scanner 400 may include an image rendering component, such as a marking engine, which renders the stored image on a substrate, such as paper, using colorants such as inks or toners. A facsimile machine incorporating or linked to the document scanner 400 may include a processing component for outputting the stored digital image in a form which may be transmitted via a telephone line, Ethernet link, cable link or other suitable wired or wireless link.

As illustrated in FIG. 5, the light 508 produced by the light source 504 is reflected and scattered 510 along the length of the guide 500 by the outcoupling zones 502, and diffused out via the first diffusion component 506, shown as the emitted light 512. The illuminator of FIG. 5 further includes a secondary diffusion component 514 at least partially surrounding the light guide 500. The secondary diffusion component 514 is suitable placed a predetermined distance away from the first diffusion component 506 of the light guide 500, so as to create an air gap 516 therebetween.

The secondary diffusion component 514 may be constructed of a suitable plastic, allowing for the passage of light therethrough. According to one implementation, the secondary diffusion component 514 is of a partially cylindrical shape, so as to curve around the light guide 500, and is in contact with a reflector (not shown) located proximate to the back portion of the guide 500 having the outcoupling zones 502 affixed thereto. The emitted light 512 is then diffused by the secondary diffusion component 514, resulting in scattered light 518 which does not form the pattern 202 produced by previous light guide implementations. A more detailed drawing of the present embodiment is illustrated in FIG. 6, discussed in greater detail below.

In some embodiments, the second diffusion component 514 may result in a scattering loss of 15% or less of the light 512 emitted by the light guide 500. It should be noted that such loss is not a result of absorption by the second diffusion component 514. The air gap 516 may be any reasonable distance between the front portion 506 and the second diffusion component 514. In the embodiments discussed herein, an air gap 516 greater than or equal to 0.5 mm may be used to separate the second diffusion component 514 from the first diffusion component 506. For example, the air gap 516 may be implemented as 0.5-5 mm, 5-10 mm, 10-15 mm, etc., depending upon the amount of light 512 produced by the light guide 500, the required amount of diffusion, the distance of the light guide 502 or secondary diffusion component 512 from the platen 410, and various other parameters that may impact the performance of the illumination of a document. In addition, the air gap 516 may be even greater when a single secondary diffusion component 514 is utilized to diffuse light output by a plurality of light guides.

Figure 6:
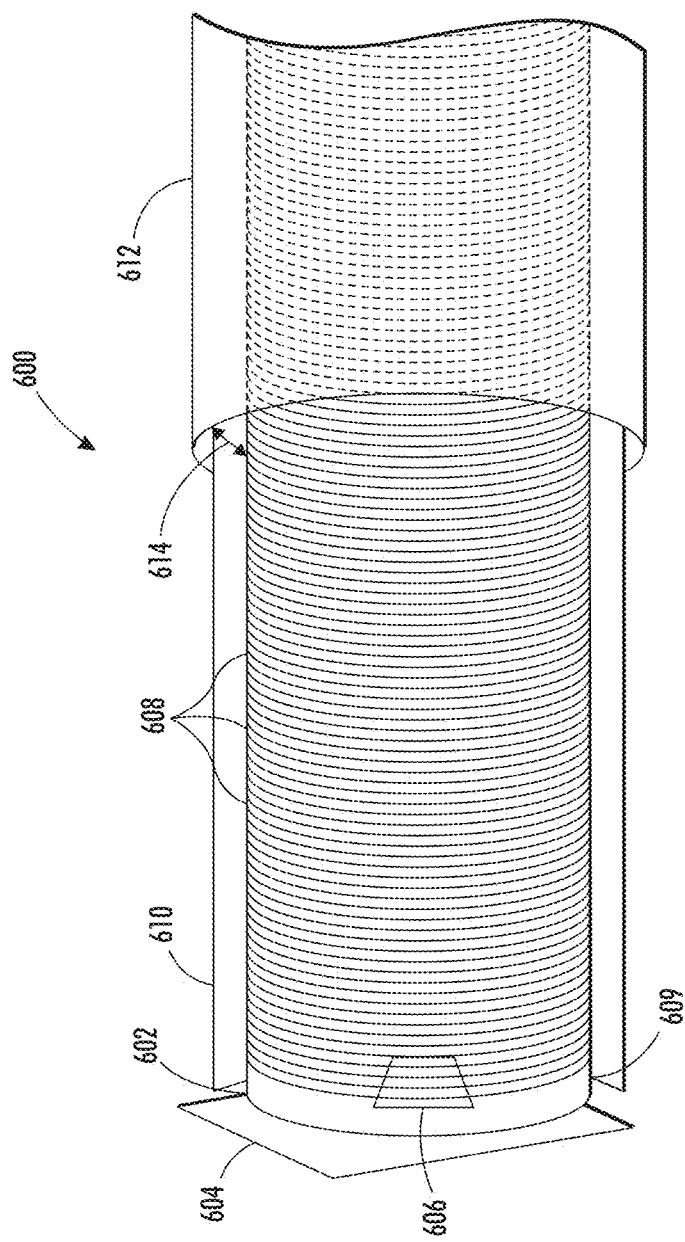
FIG. 6 is a detailed illustration of the illuminator having a secondary diffuser for correcting light guide patterning of FIG. 5.

FIG. 6 depicts a detailed illustration of an illuminator 600 having a secondary diffuser for correcting light guide patterning according to one embodiment of the present disclosure. The illuminator 600 may include a hollow tubular light guide 602 coupled to a body mount frame 604. The body mount 604 may be configured to be removeably attached to a document reproduction device so as to hold the light guide 602 in suitable position for illumination operations. In some embodiments, the body mount 604 may be aluminum, steel, or suitable composition capable of supporting the components illustrated in FIG. 6. The body mount 604 may extend the length of the light guide 602, so as to couple the guide 602 the document reproduction device at both opposing ends, may only contact the light guide 602 at a single end, or the like.

Positioned inside the light guide 602 at one end thereof, is at least one light source 606, illustrated in FIG. 6 as an LED light source. It will be appreciated that the light source 606 may include any suitable number of LEDs so as to sufficiently illuminate a document being reproduced or scanned. While illustrated as being coupled to one side of the light guide 602, other embodiments may employ a plurality of light sources within the light guide 602, light sources at opposing ends of the light guide 602, or the like.

The light guide 602 illustrated in FIG. 6 further includes a plurality of outcoupling zones 608 located at the rear portion of the light guide 602. The outcoupling zones 608 may comprise a set of ridges or reflectors located in direct contact with the light guide 602 and configured to reflect or direct light through a first diffusing component 609, i.e., the front of the light guide 602, onto the document being illuminated. The outcoupling zones 608 illustrated in FIG. 6 are shown as equidistant apart for example purposes only, and the actual distance between the zones 608 may be dependent upon the output of the light source 606, the distance from the light guide 602 to the document being illuminated, the consistency of a secondary diffusion component 612 (as set forth below), and the like. It will be appreciated that the design and configuration of such zones 608 may further be dependent upon the type of document reproduction being performed, the cost associated with the document reproduction device, the control systems in place, and the like.

The illuminator 600 further includes a rear reflector component 610 proximally located at the rear of the light guide 602. In some embodiments, the rear reflector component 610 comprises a white reflective metal or plastic suitably configured and angled to reflect light towards the front of the light guide 602, i.e., onto the document being illuminated. The rear reflector component 610 may be in contact with the light guide 602 along its longitudinal direction, or separated therefrom. The rear reflector component 610 may be coupled at opposing ends to the body mount 604 so as to maintain its structural integrity or position relative to the light guide 602.

The illuminator 600 also includes a secondary diffusion component 612 positioned a predetermined distance from the surface of the light guide 602, i.e., the first diffusion component 609, thereby forming an air gap 614 there between. In embodiments discussed herein, the distance of the air gap 614 may be greater than or equal to 0.5 mm. For example, the air gap 614 may be implemented as 0.5-5 mm, 5-10 mm, 10-15 mm, etc., depending upon the amount of light produced by the light guide 602, the required amount of diffusion, the distance of the light guide 602 from the platen 410, and various other parameters that may impact the performance of the illumination of a document. The air gap 614 between the second diffusion component 612 and first diffusion component 609 of the light guide 602 allows both the light diffused through the first diffusion component 609 and the light reflected off of the rear reflector component 610 to be diffused through the secondary diffusion component 612.

Figure 7:
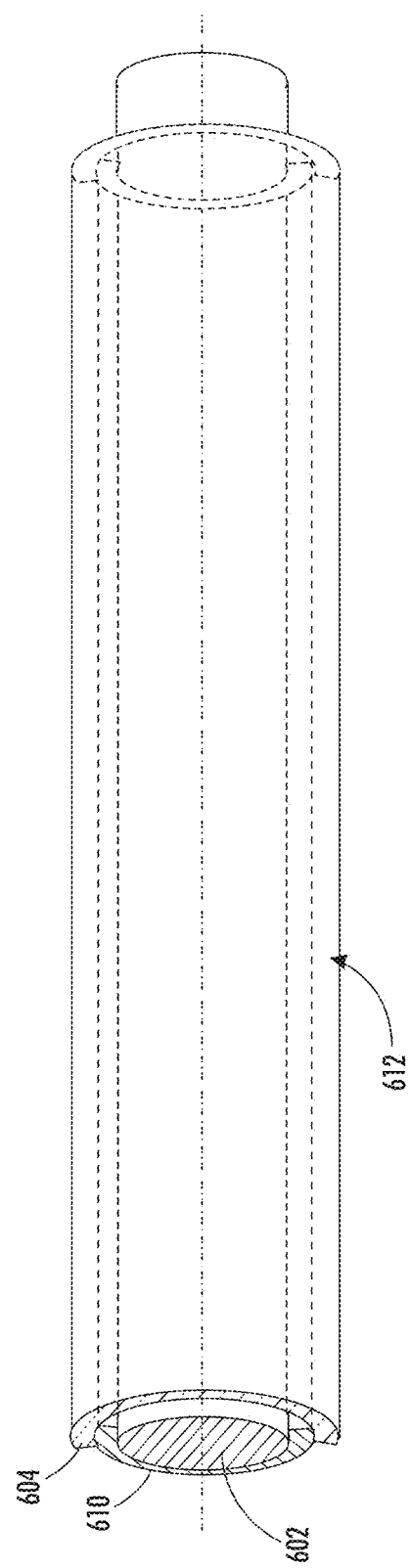
FIG. 7 is another view illustrating the illuminator having a secondary diffuser for correcting light guide patterning of FIG. 6.

In the example embodiment illustrated in FIG. 6, the secondary diffusion component 612 is configured to be partially cylindrical in implementation, having a diameter greater than the diameter of the light guide 602. In such an embodiment, the secondary diffusion component 612 is of a sufficient diameter to enclose the rear reflector component 610 therein. Such configuration may include a ⅔ to ¾ cylindrical shape to surround the light emitting portion of the light guide 602 and the light reflecting portion of the rear reflecting component 610. FIG. 7 is a representation of one implementation of the light guide 602 illustrating the complete length of the light guide 602 shown in FIG. 6. As illustrated in FIG. 7, the rear reflector 610 is partially encased by the secondary diffusion component 612. As set forth above, the body mounts 604 are adjacent to the secondary diffusion component 612 so as to allow attachment of the light guide 602 within the document scanner 400.

The secondary diffusion component 612 of FIGS. 6 and 7 may be constructed of a partially opaque plastic, glass, or other material capable of allowing light to transit therethrough. The secondary diffusion component 612 may be constructed or extruded as a sheet of material, which may then be curved around the light guide 502 and the rear reflector component 610. The long axis of such a sheet may be removeably coupled to the body frame mount 604 via fasteners, adhesives, welds, fixtures, or other suitable attachment means. The secondary diffusion component 612 may further have a length comparable to the length of the light guide 602, such that the short ends abut, contact or are sufficiently proximate to the body frame mount 604 so as to prevent light escaping around the secondary diffusion component 612.

The secondary diffusion component 612 may allow light emitted by the light guide 602 to pass with minimal loss due to scattering, from approximately 10-15%. In contrast, the positioning and composition of the secondary diffusion component 612 prevents loss due to absorption. Accordingly, the secondary diffusion component 612 may be constructed of materials having selected optical transmission properties within the visible wavelengths. In accordance with other embodiments, the optical transmission properties of the secondary diffusion component 612 may be selected in accordance with a particular light source, e.g., when using non-white light, the properties of the component 612 may be selected so as to filter out unwanted or undesirable wavelengths. Thus, the secondary diffusion component 612 may be implemented using a variety of light sources 604, and reference to the LED-based light source is for example purposes only. According to one embodiment, the configuration of the secondary diffusion component 612 around the light guide 602 results in the production of a wider, more uniform illumination region perpendicular to the longitudinal axis of the light guide 602. Additionally, the illuminator 600 illustrated in FIGS. 6 and 7 provides greater robustness in the positioning of the imaging point relative to the light source 606.

It will be appreciated that the angle of illumination from an LED-based light guide is much narrower than is available when using lamp-based systems. This narrowing of the angle leads to an imaging problem, such that because of the narrow profile of the LED-based light guide, the peak illumination effectively dropped off. In contrast, the embodiments disclosed herein provide a greater width of illumination via the air gap 614 and secondary diffusion component 612, effectively providing a wider illumination area for exploitation. That is, the illumination region of the light guide 602 of the illuminator 600 is wider and more uniform in the direction perpendicular to the light guide axis. Accordingly, such widening allows greater latitude in the positioning of the imaging point relative to the light source than other illuminator implementations.

Figure 8:
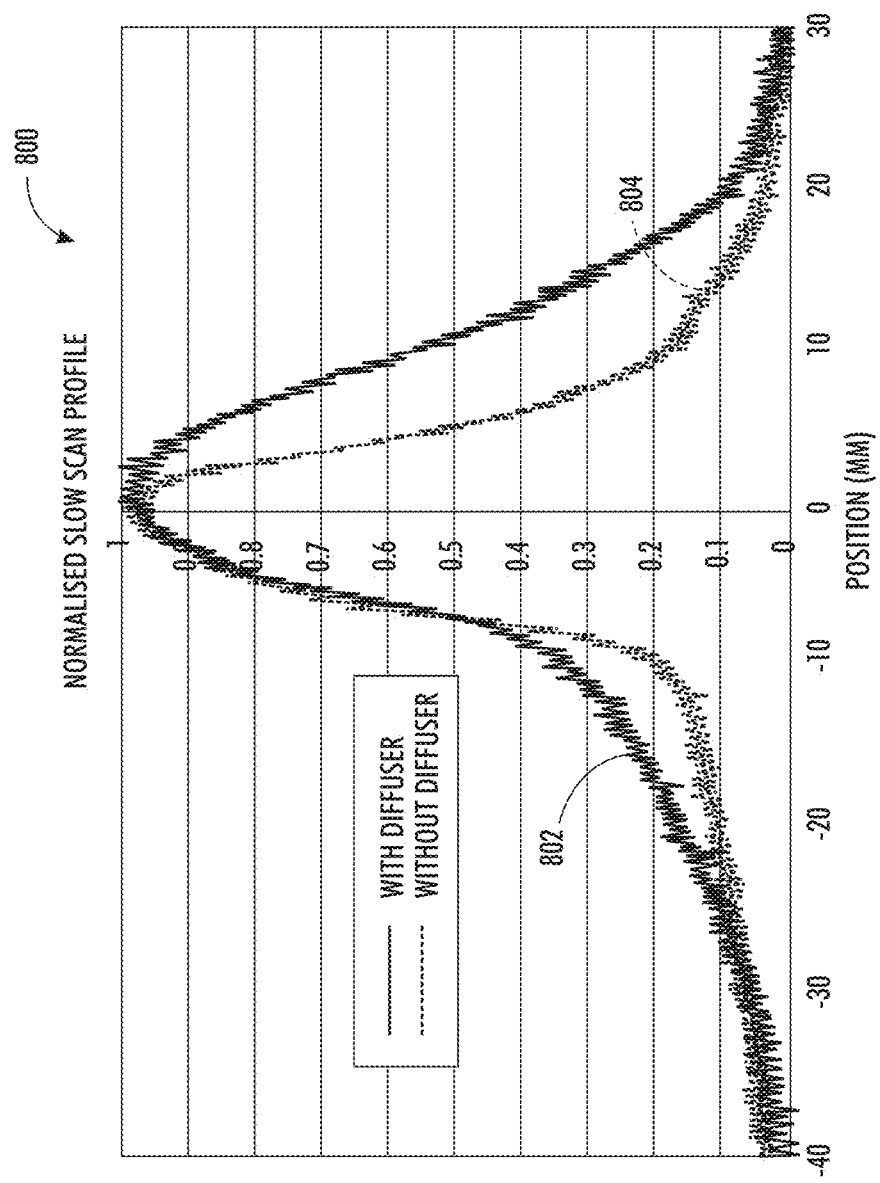
FIG. 8 is a graphical illustration depicting normalized slow scan profiles of light guides with and without the patterning prevention apparatus according to one embodiment.

FIG. 8 provides a graphical representation 800 of a normalized slow scan profile 802 of a light guide 602 employing the secondary diffusion component 612 as shown in the illuminator 600 of FIGS. 6 and 7 relative to a normalized slow scan profile 804 of a light guide 100 without a diffusion component, as shown in the illuminator of FIG. 1. As shown in FIG. 8, the width of illumination of the light guide 602 employing the secondary diffusion component 612 is greater than the width of the light guide 100 lacking such secondary diffusion component 612.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A scanning apparatus comprising:
an illuminator for illuminating a portion of a document to be scanned, the illuminator comprising:
a cylindrical light guide including:
a light source coupled to a first end, the light source configured to emit light along a length of the cylindrical light guide, and
a first diffuser forming a front portion of the light guide, the first diffuser operable to diffuse at least a portion of the emitted light exiting the front portion of light guide;
a secondary diffuser having a partially cylindrical shape, located a predetermined distance from the front portion of the light guide forming an air gap there between, the secondary diffuser configured to further diffuse the at least a portion of the light diffused by the first diffuser after passage through the air gap;
a body mount coupled to at least one end of the cylindrical light guide, the body mount configured to be removeably affixed to the scanning apparatus; and
a reflector component coupled to the body mount, the reflector component positioned longitudinally along the rear portion of the cylindrical light guide and comprising an angle to reflect the emitted light toward the front portion of the cylindrical light guide,
wherein the secondary diffuser is coupled at a top portion to a top portion of a rear of the reflector component and at a bottom portion to a bottom portion of the rear of the reflector component, the secondary diffuser operable to diffuse light reflected by the reflector component.

2. The scanning apparatus of claim 1, wherein the light guide further comprises a plurality of outcoupling zones affixed to a rear portion of the light guide, each of the plurality of outcoupling zones affixed non-uniformly apart from each other outcoupling zone and configured to direct at a portion of the light emitted by the light source through the first diffuser.

3. The scanning apparatus of claim 1, wherein the secondary diffuser contacts the reflector component longitudinally with respect to the cylindrical light guide.

4. The scanning apparatus of claim 3, wherein the secondary diffuser comprises a partially opaque plastic film.

5. The scanning apparatus of claim 4, wherein the air gap formed between the first diffuser and the secondary diffuser is in the range from 0.5 mm to 5 mm.

6. The illuminator of claim 1, wherein an end of the secondary diffuser is located adjacent to the body mount at the at least one end of the light guide.

7. An illuminator, comprising:
a tubular light guide including a discrete light source operatively coupled to at least one end thereof;
a first diffuser forming a front portion of the light guide, the first diffuser operable to diffuse light emitted by the discrete light source;

a secondary diffuser having a diameter greater than a diameter of the tubular light guide, the secondary diffuser operable to diffuse the light diffuse by the first diffuser, wherein the first diffuser and the secondary diffuser are separated by a defined air gap;

a body mount coupled to at least one end of the tubular light guide; and a reflector component coupled to the body mount, the reflector component positioned longitudinally along a rear portion of the tubular light guide and comprising an angle to reflect the emitted light toward the front portion of the tubular light guide, wherein the secondary diffuser is ⅔ to ¾ cylindrical shaped to surround the first diffuser and a light reflecting portion of the reflector component, the secondary diffuser operable to diffuse light reflected by the reflector component.

8. The illuminator of claim 7, further comprising a plurality of outcoupling zones affixed to the rear portion of the light guide, the outcoupling zones configured to direct light emitted by the discrete light source toward the front portion of the light guide.

9. The illuminator of claim 8, wherein the plurality of outcoupling zones are affixed in a non-uniform manner to the rear portion of the light guide.

10. The illuminator of claim 8, wherein the body mount configured to be removeably affixed to an associated scanner device.

11. The illuminator of claim 10, wherein an end of the secondary diffuser is located adjacent to the body mount at the at least one end of the light guide.

12. The illuminator of claim 11, wherein the secondary diffuser comprises a partially opaque plastic film.

13. The illuminator of claim 12, wherein the defined air gap is in the range from 0.5 mm to 5 mm.

14. The illuminator of claim 7, wherein the light source further comprises at least one light emitting diode.

15. A scanning apparatus comprising the illuminator of claim 7.

16. A method for scanning a document comprising:
emitting light into a cylindrical light guide from a discrete light source, the cylindrical light guide including:
a plurality of outcoupling zones affixed to a rear portion of the cylindrical light guide configured to direct at least a portion of the emitted light, and
a first diffuser forming a front portion of the cylindrical light guide, the first diffuser operable to diffuse the at least a portion of the emitted light exiting the front portion of cylindrical light guide;
transmitting the emitted light through the first diffuser to a secondary diffuser across an air gap, the secondary diffuser having a diameter greater than a diameter of the cylindrical light guide;
transmitting the emitted light to a reflector component positioned opposite the front portion of the light guide and having an angle thereof;
reflecting, via the reflector component, light emitted through a back portion of the light guide through the secondary diffuser; and
illuminating the document with the emitted light transmitted through the first and secondary diffusers, wherein the secondary diffuser is ⅔ to ¾ cylindrical shaped to surround the first diffuser and a light reflecting portion of the reflector component, the secondary diffuser operable to diffuse light reflected by the reflector component.

17. An illuminator for removing light guide patterning during document illumination, comprising:
a cylindrical light guide, the cylindrical light guide including:
a light source operatively coupled to a first end, the light source configured to emit light along a length of the cylindrical light guide,
a plurality of outcoupling zones affixed to a rear portion of the light guide, each of the plurality of outcoupling zones affixed a predetermined distance from each other outcoupling zone, the plurality of outcoupling zones configured to direct at least a portion of the emitted light, and
a first diffuser forming a front portion of the cylindrical light guide, the first diffuser operable to diffuse the at least a portion of the emitted cylindrical light exiting the front portion of cylindrical light guide;
a body mount coupled to at least one end of the cylindrical light guide and
a secondary diffuser located a predetermined distance from the front portion of the cylindrical light guide forming an air gap there between, the secondary diffuser configured to further diffuse the at least a portion of the emitted light diffused by the first diffuser after passage through the air gap
a reflector component coupled to the body mount, the reflector component positioned longitudinally along a rear portion of the cylindrical light guide and comprising an angle to reflect the emitted light toward the front portion of the tubular light guide,
wherein the secondary diffuser is ⅔ to ¾ cylindrical shaped to surround the first diffuser and a light reflecting portion of the reflector component, the secondary diffuser operable to diffuse light reflected by the reflector component.

* * * * *